United States Patent
Jasti et al.

(10) Patent No.: US 7,151,875 B2
(45) Date of Patent: Dec. 19, 2006

(54) METHOD AND APPARATUS FOR BALANCING THE POWER OF OPTICAL CHANNELS TRAVERSING AN OPTICAL ADD DROP MULTIPLEXER

(75) Inventors: Chandra Sekhar Jasti, Cupertino, CA (US); Hermann Gysel, San Jose, CA (US); Mani Ramachandran, San Jose, CA (US)

(73) Assignee: General Instrument Corporation, Horsham, PA (US)

( * ) Notice: Subject to any disclaimer, the term of this patent is extended or adjusted under 35 U.S.C. 154(b) by 264 days.

(21) Appl. No.: 10/638,972

(22) Filed: Aug. 11, 2003

(65) Prior Publication Data

US 2005/0069248 A1 Mar. 31, 2005

(51) Int. Cl.
*G02B 6/42* (2006.01)
*H04J 14/02* (2006.01)
(52) U.S. Cl. .............................. 385/48; 398/68; 398/83
(58) Field of Classification Search .................. 385/24, 385/48; 398/43, 68, 82–88, 38
See application file for complete search history.

(56) References Cited

U.S. PATENT DOCUMENTS

| | | | |
|---|---|---|---|
| 6,208,441 B1 * | 3/2001 | Jones et al. .................... | 398/87 |
| 6,208,443 B1 | 3/2001 | Liu et al. ..................... | 359/127 |
| 6,385,362 B1 | 5/2002 | Norwood ...................... | 385/14 |
| 6,429,974 B1 | 8/2002 | Thomas et al. ............. | 359/618 |
| 6,721,509 B1 * | 4/2004 | Xiao et al. .................... | 398/83 |
| 6,885,825 B1 * | 4/2005 | DeGrange et al. ............ | 398/83 |

* cited by examiner

*Primary Examiner*—Michelle Connelly-Cushwa
*Assistant Examiner*—Jerry T Rahll
(74) *Attorney, Agent, or Firm*—Lawrence T. Cullen

(57) ABSTRACT

A method and apparatus is provided for power balancing an optical signal wavelength to be added to an OADM having at least one drop port and at least one add port. The method begins by monitoring a power level of a first signal wavelength being dropped on the drop port and a power level of a second signal wavelength being added on the add port. The power level of the first signal wavelength is compared to the power level of the second signal wavelength. Based on the step of comparing, the optical attenuation is adjusted along the add port so that the power level of the second signal wavelength becomes substantially equal to the power level of the first signal wavelength.

15 Claims, 4 Drawing Sheets

METHOD AND APPARATUS FOR BALANCING THE POWER OF OPTICAL CHANNELS TRAVERSING AN OPTICAL ADD DROP MULTIPLEXER

FIELD OF THE INVENTION

The present invention relates generally to optical add drop multiplexers, and more particularly to an optical add drop multiplexer in which power equalization is provided to a channel being added.

BACKGROUND OF THE INVENTION

An optical add drop multiplexer (OADM) is a device used to extract a set of optical signals (also called "wavelengths" or "channels" herein) from a wavelength division multiplexed (WDM) signal input to the OADM, and to subsequently reinsert the extracted set of wavelengths output by the OADM. FIG. 1 shows a block diagram of an OADM 100. A WDM optical signal comprises a plurality of wavelengths or channels. One of the wavelengths $\lambda_2$, is extracted (also called "dropped" herein) from an input line side 102 via a drop port 104 and then subsequently reinserted (also called "added" herein) $\lambda_2$ onto an output line side 108 via an add port 106. The purpose of adding and dropping wavelength(s) in this manner is to obtain information encoded on the dropped wavelength. New information may also be transmitted the added wavelengths. In most instances the carrier wavelength of the dropped wavelength is the same as carrier wavelength of the added wavelength.

OADMs may be implemented in a wide variety of different architectures and technologies. For example, one architecture involves arrayed waveguide grating routers and 2×2 optical switches. Another architecture involves a pair of interference filters that serve as multiplexers and demultiplexers. Depending on the architecture and the technology that is employed, an OADM may or may not be configurable, i.e., the determination of which wavelengths are dropped and added may or may not be fixed at the time of manufacture.

OADMs are employed in the network nodes of WDM transmission systems such as ring networks so that incoming data may be either passed through the node or dropped to a local receiver. If data from a particular wavelength is dropped, this wavelength is now available on the outbound direction, and hence new data can be added from a local transmitter. In a WDM system, when the optical signals are transmitted over long distances, periodic amplification of the optical signals is necessary to overcome fiber loss in the transmission path. Currently, amplification is accomplished by using optical amplifiers, e.g. Erbium Doped Fiber Amplifiers (EDFAs) or Raman amplifiers.

In general each of the wavelengths in a WDM transmission system employing optical amplifiers should have the same power. If the power levels of the wavelengths are not the same, those wavelengths having more power tend to be amplified more than other channels and take away gain that would otherwise be available for adjacent wavelengths. When such unbalanced wavelengths propagate through a series of optical amplifiers, deleterious effects may arise such as a high level of cross talk between adjacent wavelengths and nonlinearities in the fiber.

Accordingly, it would be desirable to provide an automatic power balancing arrangement for an OADM in which wavelengths or channels being added have the same power as the remaining wavelengths or channels in the WDM optical signal.

SUMMARY OF THE INVENTION

In accordance with the present invention, a method is provided for power balancing an optical signal wavelength to be added to an OADM having at least one drop port and at least one add port. The method begins by monitoring a power level of a first signal wavelength being dropped on the drop port and a power level of a second signal wavelength being added on the add port. The power level of the first signal wavelength is compared to the power level of the second signal wavelength. Based on the step of comparing, the optical attenuation is adjusted along the add port so that the power level of the second signal wavelength becomes substantially equal to the power level of the first signal wavelength.

In accordance with one aspect of the present invention, the step of monitoring the power level of the first signal wavelength includes the steps of tapping a portion of the power from the first signal wavelength as it traverses the drop port and generating a first electrical reference signal that corresponds to the tapped portion of power of the first signal wavelength.

In accordance with another aspect of the invention, the step of monitoring the power level of the second signal wavelength includes the steps of tapping a portion of the power from the second signal wavelength as it traverses the add port and generating a second electrical reference signal that corresponds to the tapped portion of power of the second signal wavelength.

In accordance with another aspect of the invention, the comparing step is performed in the electrical domain.

In accordance with another aspect of the invention, the step of adjusting the optical attenuation is performed by a variable optical attenuator coupled to the add port.

In accordance with another aspect of the invention, an optical add drop multiplexer (OADM) is provided that includes an input port for receiving a WDM optical signal having a plurality of signal wavelengths. At least one drop port is provided for extracting one of the plurality of signal wavelengths from the WDM optical signal. At least one add port is provided for inserting an add wavelength into the WDM optical signal. The OADM also includes an output port for transmitting to an external element the WDM optical signal with the add wavelength present and the extracted one of the plurality of wavelengths absent. A first monitoring arrangement monitors a power level of the extracted signal wavelength and a second monitoring arrangement monitors a power level of the add wavelength. A comparator compares the power level of the extracted signal wavelength to the power level of the add wavelength. A variable optical attenuator is coupled to the add port and adjusts optical attenuation of the add wavelength in response to a control signal received from the comparator.

In accordance with another aspect of the invention, the first monitoring arrangement includes a first optical tap located at the drop port and a first photodetector coupled to the optical tap for receiving a portion of the extracted signal wavelength.

In accordance with another aspect of the invention, the second monitoring arrangement includes a second optical tap located at the add port and a second photodetector coupled to the second optical tap for receiving a portion of the add wavelength.

In accordance with another aspect of the invention, the comparator is an electrical comparator electrically coupled to the first and second photodetectors.

In accordance with another aspect of the invention, the first and second photodetectors are photodiodes.

In accordance with another aspect of the invention, the control signal adjusts the optical attenuation of the add wavelength so that the power level of the add wavelength is substantially equal to the power level of the extracted signal wavelength.

In accordance with another aspect of the invention, an optical add drop multiplexer (OADM) is provided that includes an input port for receiving a WDM optical signal having a plurality of signal wavelengths and a plurality of drop ports each extracting one of the plurality of signal wavelengths from the WDM optical signal. A plurality of add ports each inserts an add signal wavelength into the WDM optical signal. An output port transmits to an external element the WDM optical signal with one or more add wavelengths present and one or more extracted wavelengths absent. A plurality of first monitoring arrangements is each associated with one of the drop ports. Each of the first monitoring arrangements monitors a power level of one of the extracted wavelengths and generates a first reference signal in response thereto. A plurality of second monitoring arrangements is each associated with one of the add ports. Each of the second monitoring arrangements monitors a power level of one of the add wavelengths and generates a second reference signal in response thereto. A processor receives the plurality of first reference signals and selects one of the plurality of first reference signals that represents a non-zero optical power level. A comparator arrangement compares the selected one of the first reference signals to each of the second reference signals. A plurality of variable optical attenuators is respectively coupled to the plurality of add ports for adjusting optical attenuation of the add wavelengths in response to control signals received from the comparator arrangement.

DETAILED DESCRIPTION

The present invention provides an optical add drop multiplexer (OADM) in which the power level of the signal wavelength being added is monitored, as well as the power level of the wavelength being dropped. After comparing the power levels of the dropped wavelength to the power level of the added wavelength, the added wavelength can be sufficiently attenuated so that its power level is equal to the power level of the dropped wavelength. In some cases, instead of monitoring the power level of the dropped wavelength, the WDM signal itself may be monitored, from which an average power level per wavelength can be calculated. In this case the power level of the added wavelength can be compared to the average power per wavelength that has been calculated.

Figure 1:
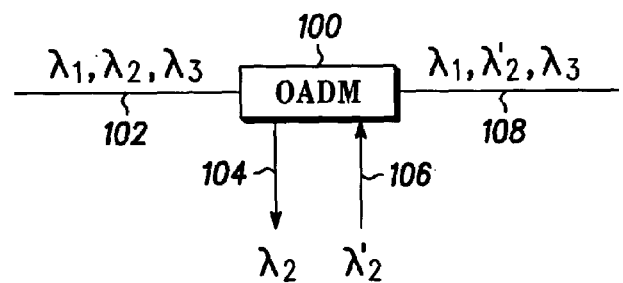
FIG. 1 shows a block diagram of a conventional optical add drop multiplexer (OADM).
Figure 2:
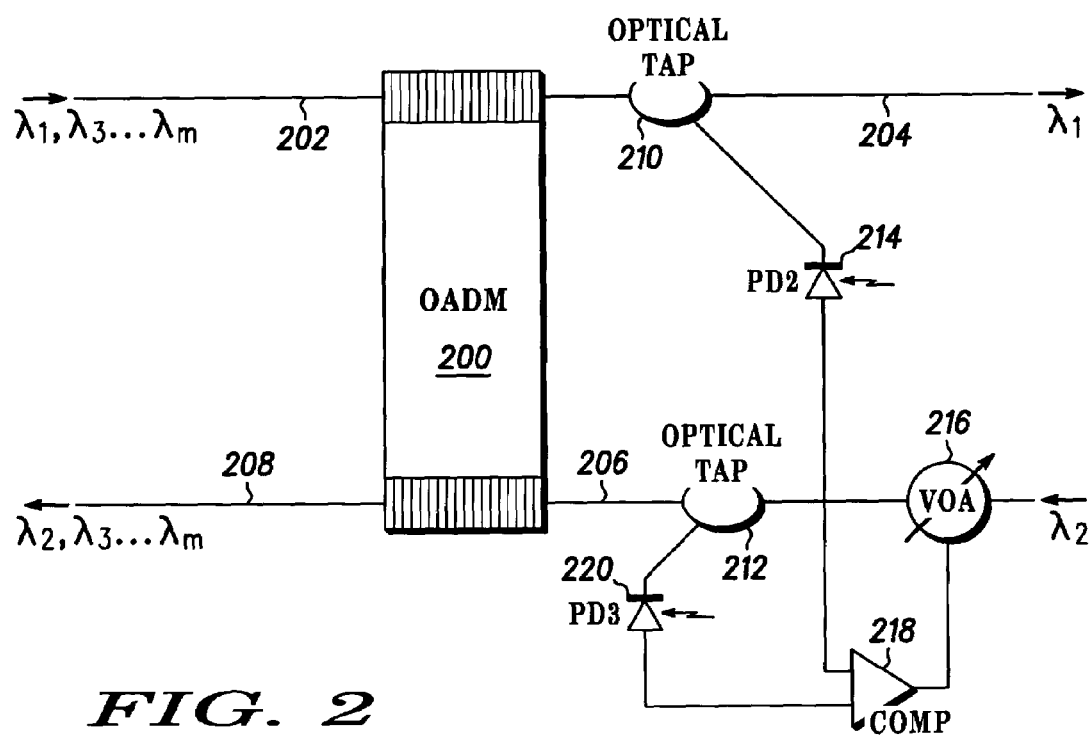
FIG. 2 shows a block diagram of one embodiment of an OADM constructed in accordance with the present invention.

FIG. 2 shows a block diagram of one embodiment of an OADM 200 constructed in accordance with the present invention. The OADM 200 includes an input line side 202, a drop port 204, an output line side 208, and an add port 206. Optical taps 210 and 212 are located to receive a small portion of the power from the wavelengths traversing the drop and add ports 204 and 206, respectively. A variable optical attenuator (VOA) 216 is also provided at the add port 206. The wavelength to be added first traverses the VOA 216 before being received by port 206 via optical tap 210. A photodiode 214 receives the power from optical tap 210 and sends an electric reference signal to an electrical comparator 218. Likewise, a photodiode 220 receives the power from optical tap 212 and sends an electric reference signal to the electrical comparator 218. The electrical comparator 218 generates an error signal representative of the power differential between the optical signal being dropped on drop port 204 and the optical signal being added on add port 206. The error signal is used to adjust the attenuation of the VOA 216 so that the error (i.e., power differential) is reduced. That is, the VOA 216 attenuates the wavelength being added on port 206 so that its power level is substantially the same as the power of the wavelength being dropped on port 204.

Figure 3:
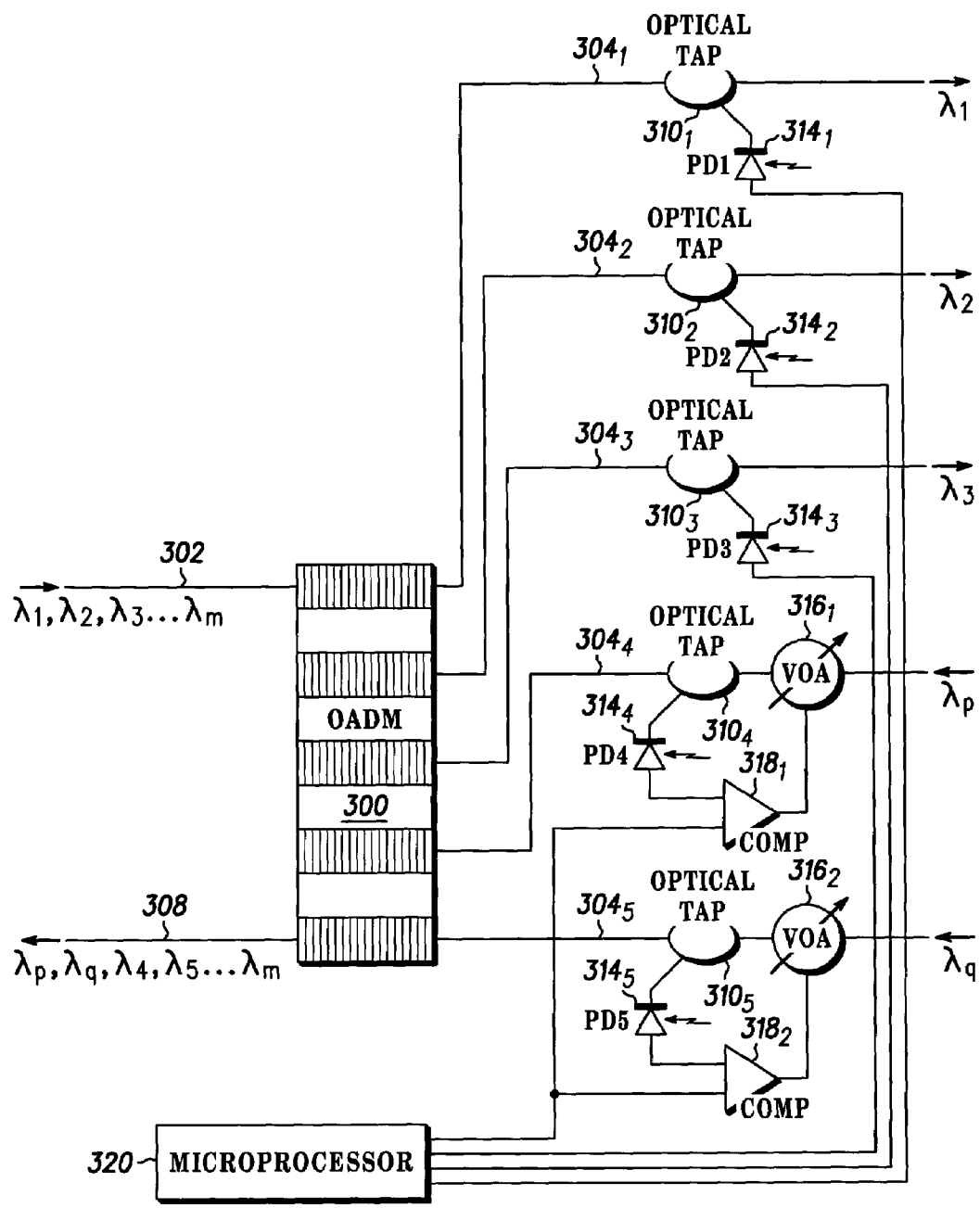
FIGS. 3–6 show alternative embodiments of the OADM in accordance with the present invention.

FIG. 3 shows an embodiment of the invention in which the OADM 300 has a multiplicity of add ports and drop ports, and specifically in this case, three drop ports $304_1$, $304_2$ and $304_3$ and two add ports $304_4$ and $304_5$. Optical taps $310_1$–$310_5$ are located to receive a small portion of the power from the wavelengths traversing the ports $304_1$–$304_5$, respectively. Variable optical attenuators (VOAs) $316_1$ and $316_2$ are provided at the add ports $304_4$ and $304_5$, respectively. Optical taps $310_1$–$310_5$ direct a small portion of the optical power respectively traversing ports $304_1$–$304_5$ to photodiodes $314_1$–$314_5$, respectively. The photodiodes $314_1$–$314_3$ associated with the drop ports direct electric reference signals to a processor 320. The photodiodes $314_4$ and $314_5$ send electric reference signals to comparators $318_1$ and $318_2$, respectively, which reference signals represent the power of the wavelengths being added. The output of the processor 320 serves as the second input to both of the comparators $318_1$ and $318_2$.

Processor 320 selects one of the electric reference signals received from photodiodes $314_1$–$314_3$ and directs it to the input of the comparators $318_1$ and $318_2$. The processor 320 ensures that the comparators $318_1$ and $318_2$ receive a valid power level for a dropped channel. This is important because not every drop port will necessarily be dropping a wavelength at any given time. Thus, in order to provide a meaningful comparison between power levels, the processor 320 will only select a reference signal from a drop port on which there is a dropped wavelength at the time the comparators $318_1$ and $318_2$ are to generate error signals that adjust the attenuation of VOAs $316_1$ and $316_2$. That is, the processor 320 will select a reference signal that represents a non-zero optical power level. For example, if processor 320 determines that no channel is being dropped on drop port $304_1$ when a channel is being added on add port $304_4$ or $304_5$, it will attempt to use a reference signal from drop port $304_2$. Similarly, if processor 320 determines that no channel is being dropped on drop port $304_2$, it will attempt to use a reference signal from drop port $304_2$. Moreover, if for some reason the WDM signal being received on the input port 302 of OADM 300 should fail so that no dropped channel is available, processor 320 can use previous reference signal values that it has stored in memory. In this way the processor 320 can be used to operate the system in the event of a failure at the OADM input 302, which may occur as a result of a fiber break, for example.

Figure 4:
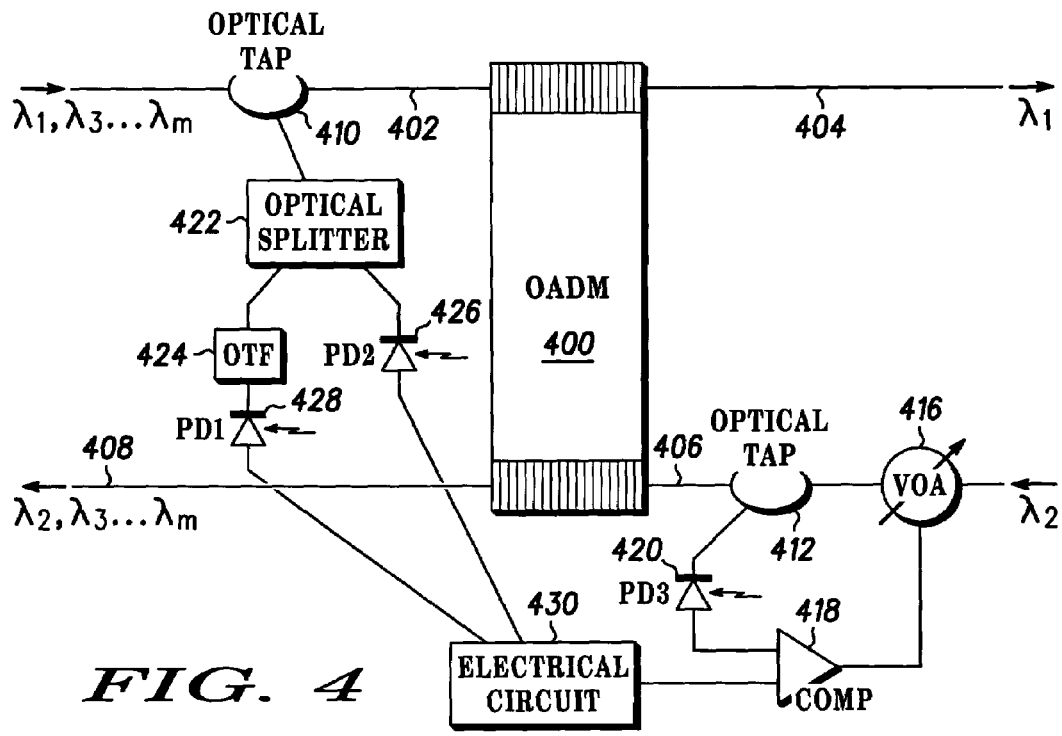

FIG. 4 shows an alternative embodiment of the invention in which the channel power at the input port to the OADM 400 is monitored instead of the channel power at the drop ports. In this case the monitoring arrangement determines both the total power of the WDM signal received on input port 402 and the total number of wavelengths or channels in the WDM signal, from which an average power per channel can be determined. As shown, an optical tap 410 is provided at the input port 402. The optical tap 410 directs a small portion of the WDM signal to an optical splitter 422. The optical splitter 422, in turn, directs a portion of the WDM signal to a photodiode 426, the output of which is a reference signal that represents the total power of all the wavelengths that comprise the input WDM signal. The optical splitter 422 directs the remaining portion of the WDM signal to an optical tunable filter 424. The tunable filter 424 can be tuned over the entire wavelength band occupied by the input WDM signal. For example, if the WDM signal is located in the C band that encompasses wavelengths between 1525 and 1565 nm, then the tunable filter can be tuned over this same range. The output from the tunable filter is directed to a photodiode 428, which generates a reference signal in response thereto.

As the optical tunable filter 424 is swept across its waveband, the reference signal generated by photodiode 428 will go through peaks that correspond to the location of a channel and troughs that correspond to locations between channels. The number of channels employed in the input WDM signal corresponds to the number of peaks in the reference signal. The number of peaks can be counted by a register associated with an electrical circuit 430. The electrical circuit 430 also receives the reference signal from photodiode 426. Given the total power of the input WDM signal (as represented by the reference signal from photodiode 426) and the number of channels in the WDM signal (as represented by the number of peaks in reference signal from photodiode 428), the electrical circuit 430 can calculate the average power per wavelength or channel. The electric circuit 430 forwards this value to an input of the comparator 418, which as in the previous embodiment of the invention, receives at its other input a signal representative of the channel being added on add port 406. Once again, the comparator 418 adjusts the attenuation of the VOA 416 so that in this case the power of the added wavelengths is about equal to the average power per wavelength of the input WDM signal.

Figure 5:
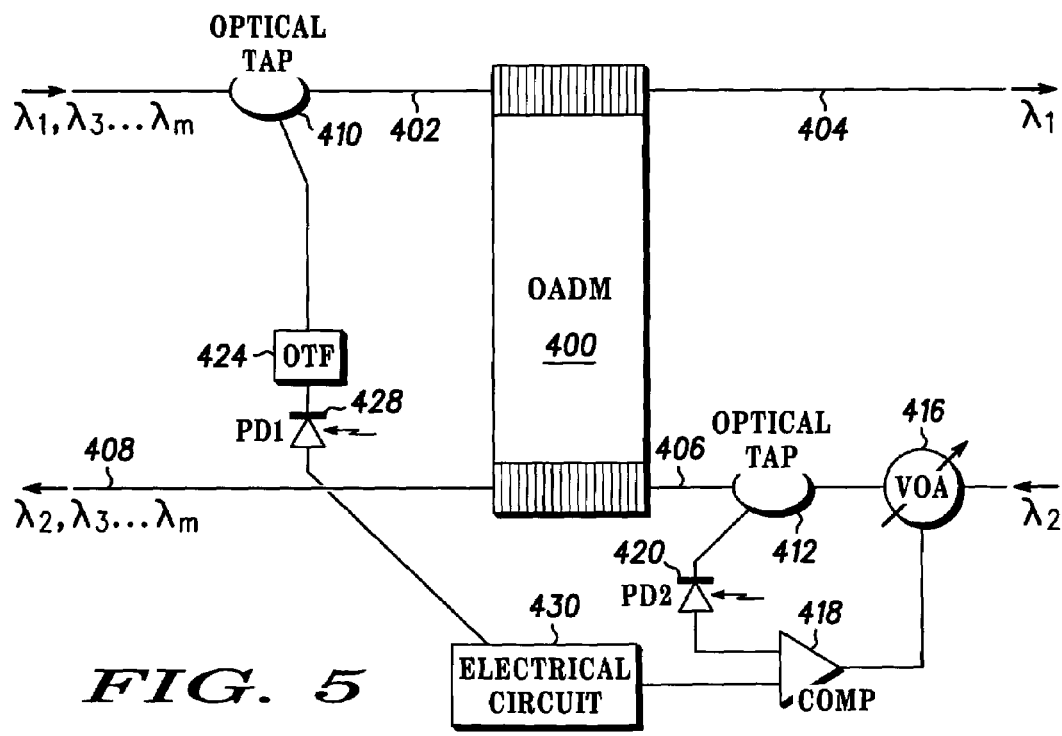

FIG. 5 shows an alternative embodiment of the invention that is similar to the embodiment depicted in FIG. 4, except that in FIG. 5 the optical splitter 422 and photodiode 426 are eliminated. In FIGS. 4 and 5, as well as FIG. 6 discussed below, like components are indicated by like reference numerals. In FIG. 4, the splitter 422 and photodiode 426 are used to determine the total power of the input WDM signal. In FIG. 5, this value can alternatively be determined by integrating the reference signal generated by photodiode 428 over the entire bandwidth of the optical tunable filter 424.

One problem with the embodiments of the invention shown in FIGS. 4 and 5 is that the WDM signal is tapped at the input port 402 to the OADM. This gives rise to optical losses in the OADM that must be taken into account when balancing the power of the added wavelengths. The optical losses can be accounted for by having the comparator 418 provide an offset voltage to the VOA 416 by the comparator 418 along with the error signal. However, the need for such an offset voltage can be avoided if the optical tap and tunable filter are located at the output port of the OADM instead of the input port. Such an arrangement is shown in FIG. 6.

Figure 6:
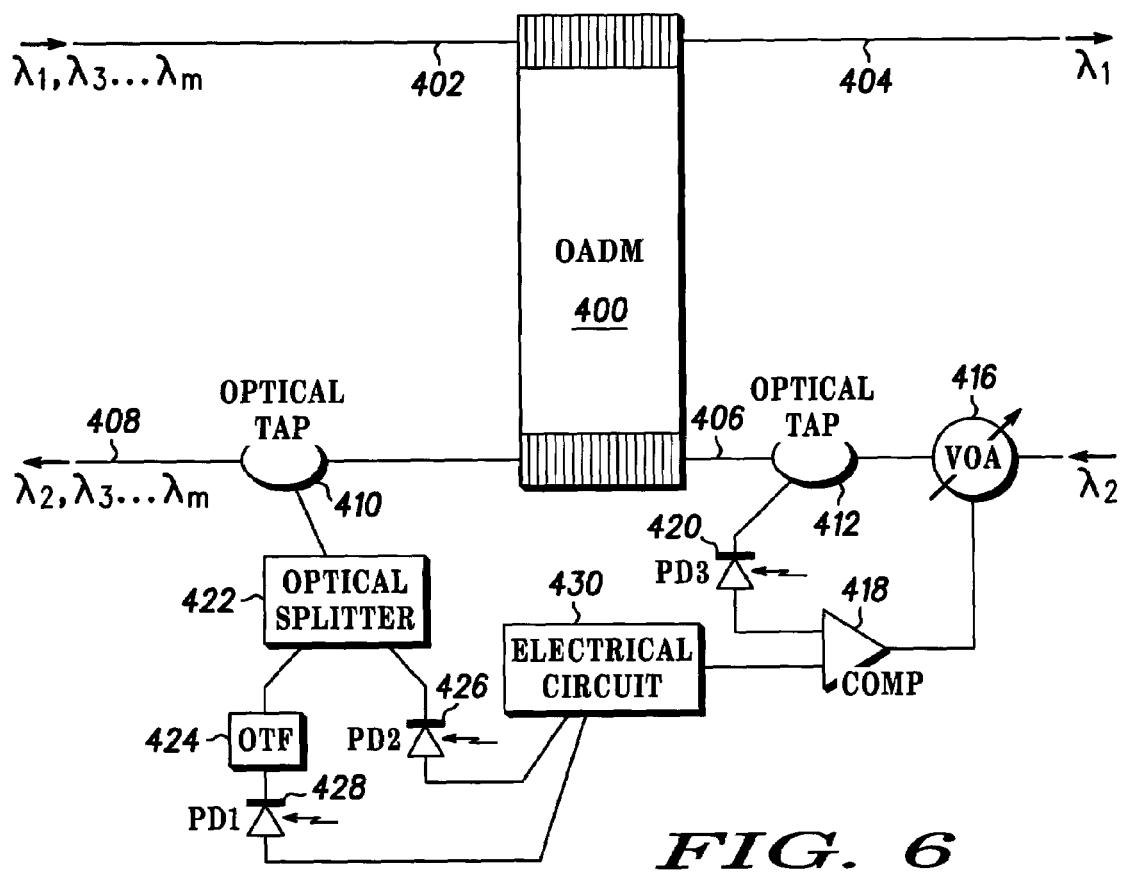

Similar to FIG. 4, in FIG. 6 the optical splitter 422 and photodiode 426 are employed. In another embodiment of the invention, however, the optical splitter 422 and photodiode 426 of FIG. 6 may be eliminated for the reason discussed in connection with FIG. 5.

What is claimed is:

1. An optical add drop multiplexer (OADM) comprising:
   an input port for receiving a WDM optical signal that includes a plurality of signal wavelengths;
   at least one drop port for extracting one of the plurality of signal wavelengths from the WDM optical signal;
   at least one add port for inserting an add wavelength into the WDM optical signal;
   an output port for transmitting to an external element the WDM optical signal with the add wavelength present and the extracted one of the plurality of wavelengths absent;
   a first monitoring arrangement for monitoring an average power level of the signal wavelengths in said WDM optical signal;
   a second monitoring arrangement for monitoring a power level of the add wavelength;
   a comparator for comparing the average power level of the signal wavelengths in said WDM signal to the power level of the add wavelength; and
   a variable optical attenuator coupled to the add port for adjusting optical attenuation of the add wavelength in response to a control signal received from the comparator,
   wherein said first monitoring arrangement includes:
   a first optical tap located at the input port;
   an optical splitter having an input coupled to the first optical tap for receiving a portion of WDM optical signal therefrom;
   an optical tunable filter coupled to a first output of the optical splitter;
   a firsts photodetector coupled to the optical tunable filter;
   a second photodetector coupled to a second output of the optical splitter;
   an electric circuit receiving first and second reference signals from the first and second photodetectors, respectively, and generating a third reference signal that is provided to a first input of the comparator.

2. The OADM of claim 1 wherein said second monitoring arrangement includes a second optical tap located at the add port and a third photodetector coupled to the second optical tap for receiving a portion of the add wavelength.

3. The OADM of claim 1 wherein said first and second photodetectors are photodiodes.

4. The OADM of claim 1 wherein said control signal adjusts the optical attenuation of the add wavelength so that the power level of the add wavelength is substantially equal to the average power level of the signal wavelengths in said WDM signal.

5. An optical add drop multiplexer (OADM) comprising:
   an input port for receiving a WDM optical signal that includes a plurality of signal wavelengths;
   at least one drop port for extracting of the plurality of signal wavelengths from the WDM optical signal;
   at least one add port for inserting an add wavelength into the WDM optical signal;
   an output port for transmitting to an external element the WDM optical signal with the add wavelength present and the extracted one of the plurality of wavelengths absent;

a first monitoring arrangement for monitoring an average power level of the signal wavelengths in said WDM optical signal;

a second monitoring arrangement for monitoring a power level of the add wavelength;

a comparator for comparing the average power level of the signal wavelengths in said WDM signal to the power level of the add wavelength; and a variable optical attenuator coupled to the add port for adjusting optical attenuation of the add wavelength in response to a control signal received from the comparator, wherein said first monitoring arrangement includes:

a first optical tap located at the output port;

an optical splitter having an input coupled to the first optical tap for receiving a portion of WDM optical signal therefrom;

an optical tunable filter coupled to a first output of the optical splitter;

a first photodetector coupled to the optical tunable filter;

a second photodetector coupled to a second output of the optical splitter;

an electric circuit receiving first and second reference signals from the first and second photodetectors, respectively, and generating a third reference signal that is provided to a first input of the comparator.

6. A method of power balancing an optical signal wavelength to be added to OADM having an input port for receiving a WDM optical signal that includes a plurality of signal wavelengths, at least one drop port, at least one add port, and an output port, said method comprising the steps of:

monitoring an average power level of the signal wavelengths in the WDM signal;

monitoring a power level of a second signal wavelength being added on the add port;

comparing the average power level of the signal wavelengths in the WDM signal to the power level of the second signal wavelength;

based on the step of comparing, adjusting optical attenuation along the add port so that the power level of the second signal wavelength becomes substantially equal to the average power level of the signal wavelengths in the WDM optical signal, wherein the step of monitoring the average power level comprises the steps of tapping a portion of the power from the WDM optical signal, splitting said portion into first and second subportions of the WDM optical signal, monitoring the first subportion to determine a power level of each of the signal wavelengths in the WDM optical signal, monitoring the second subportion to determine a total power level of the WDM optical signal, and generating a first electrical reference signal that represents the average power level of the signal wavelengths in the WDM signal.

7. The method of claim 6 wherein the step of monitoring the first subportion to determine a power level of the signal wavelengths in the WDM optical signal includes the steps of directing the first subportion through an optical tunable filter and sweeping the optical tunable filter so that its passband traverses each wavelength in a waveband occupied by the WDM optical signal.

8. The method of claim 6 wherein the step of monitoring the power level of the second signal wavelength comprises the steps of tapping a portion of the power from the second signal wavelength as it traverses the add port and generating a second electrical reference signal that corresponds to the tapped portion of power of the second signal wavelength.

9. The method of claim 6 wherein the step of monitoring the power level of the second signal wavelength comprises the steps of tapping a portion of the power from the second signal wavelength as it traverses the add port and generating a second electrical reference signal that corresponds to the tapped portion of power of the second signal wavelength.

10. The method of claim 9 wherein the comparing step includes the step of comparing the second electrical reference signal to the first electrical reference signal.

11. The method of claim 6 wherein the comparing step is performed in the electrical domain.

12. The method of claim 6 wherein the step of adjusting the optical attenuation is performed by an variable optical attenuator coupled to the add port.

13. The method of claim 6 wherein the step of monitoring the average power level of the signal wavelengths in the WDM signal is performed at the input port.

14. The method of claim 6 wherein the step of monitoring the average power level of the signal wavelengths in the WDM signal is performed at the output port.

15. A method of power balancing an optical signal wavelength to be added to OADM having an input port for receiving a WDM optical signal that includes a plurality of signal wavelengths, at least one drop port, at least one add port, and an output port, said method comprising the steps of:

monitoring an average power level of the signal wavelengths in the WDM signal;

monitoring a power level of a second signal wavelength being added on the add port;

comparing the average power level of the signal wavelengths in the WDM signal to the power level of the second signal wavelength;

based on the step of comparing, adjusting optical attenuation along the add port so that the power level of the second signal wavelength becomes substantially equal to the average power level of the signal wavelengths in the WDM optical signal;

wherein the step of monitoring the average power level includes the steps of directing the WDM signal through an optical tunable filter and sweeping the optical tunable filter so that its passband traverses each wavelength in a waveband occupied by the WDM optical signal.

* * * * *